Aug. 18, 1936.  B. NORTON ET AL  2,051,570

DUST EXTRACTION

Filed Oct. 13, 1932  2 Sheets-Sheet 1

INVENTORS
B. NORTON & J.N.COLLINS
BY
Blair & Kilcoyne
ATTORNEYS

Aug. 18, 1936.　　　B. NORTON ET AL　　　2,051,570
DUST EXTRACTION
Filed Oct. 13, 1932　　　2 Sheets-Sheet 2
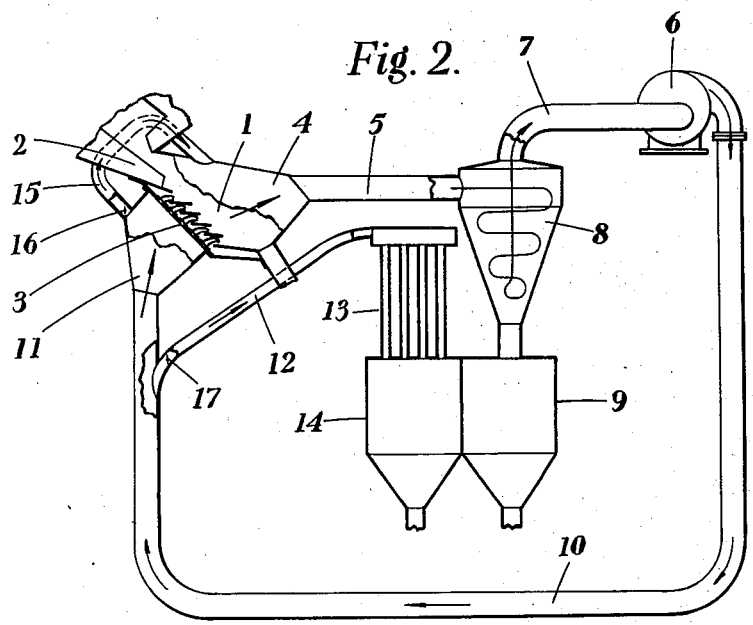
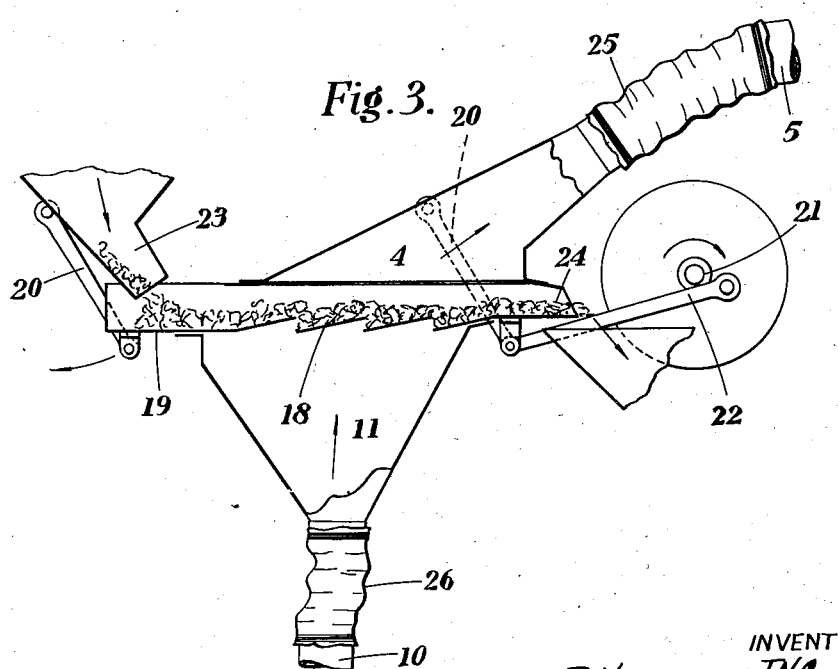
INVENTORS.
B. NORTON & J. N. COLLINS
BY
ATTORNEY.

Patented Aug. 18, 1936

2,051,570

UNITED STATES PATENT OFFICE 2,051,570

DUST EXTRACTION

Bertram Norton, Claverley, near Wolverhampton, and John Newton Collins, Birmingham, England Application October 13, 1932, Serial No. 637,626
In Great Britain February 1, 1932

3 Claims. (Cl. 209—137)

This invention relates to methods of and plant for the separation of materials from one another in accordance with their mass and superficial area, such as the separation of dust from coal, by causing the materials to move in a separating chamber so as to present a number of gas-permeable surfaces while being traversed by an air stream passing through the said gas-permeable surfaces, so that the dust or the like is picked up and carried away by the air stream. In the use of plant of this kind two difficulties are encountered; one of these is to prevent dust escaping into the atmosphere surrounding the apparatus and the other is to control the amount of air passing through the materials and yet to maintain substantially constant the volume of air passing through the fan or the like which sets up the air stream. The invention aims at overcoming these difficulties.

In order to prevent the escape of dust we make use of an air circuit which includes a dust collector, a fan or the like for causing air to move through the circuit, and means for discharging from the circuit some of the air passing through the circuit, so that there is a deficiency in the amount of air which passes back through the circuit to the separating chamber. This separating chamber is provided with means for the supply and withdrawal of air respectively and with openings through which the materials are charged and discharged but is preferably otherwise closed against the ingress or egress of air. The deficiency of air in the air circuit is then made good by positive induction of air into the separating chamber through at least the charging opening and through the discharging opening also if it is sufficiently open to the atmosphere for dust to escape through it. We prefer to provide a number of valve-controlled nozzles or openings in the air supply hood or the like, because by this means we can control the air flow at each of the permeable surfaces within the separating chamber. Most conveniently the air drawn from the chamber is passed to a cyclone or like separator and thereafter some of it is passed through one or more filters for the removal of light dust not separated in the cyclone or the like and then allowed to escape to the atmosphere, while the remainder travels in the circuit back towards the chamber. It is preferred to provide a fan or the like between the chamber and the cyclone so that the latter works under pressure, which is a condition necessary for high efficiency. However, sometimes the dust to be separated has a very destructive action upon metal and in such a case the air charged with dust may be passed directly from the chamber to the cyclone and the discharge side of the latter may be subjected to the suction action of a fan or the like.

It is essential that the volume of air passing to the fan should be constant, because otherwise it will not carry forwards through the circuit the dust or the like picked up in the separating chamber. At the same time it is desirable to be able to control the quantity and pressure of air passing across the chamber. In order to be able to do this, we provide according to one feature of our invention, a by-pass pipe connecting the air supply pipe or hood of the separating chamber with the dust removal hood, so that whatever the setting of the valve in the by-pass pipe, that is however much air is by-passed around the materials, there is always the full volume of air to take the dust away from the dust removal hood.

It is preferred to provide as usual a number of inclined shelves in the chamber so arranged that material delivered to the uppermost of them can fall in a series of cascades from shelf to shelf, but the invention is not limited to the manner in which the materials are caused to move so as to present the gas-permeable surfaces.

In order that the invention may be clearly understood and readily carried into effect, three plants in accordance therewith will now be described by way of example with reference to the accompanying drawings, which show the general arrangement of the plants more or less diagrammatically.

In the drawings

Figure 2 is a view similar to Figure 1 showing a modified construction.

Figure 3 is a sectional view of the dedusting chamber.

Figure 1:
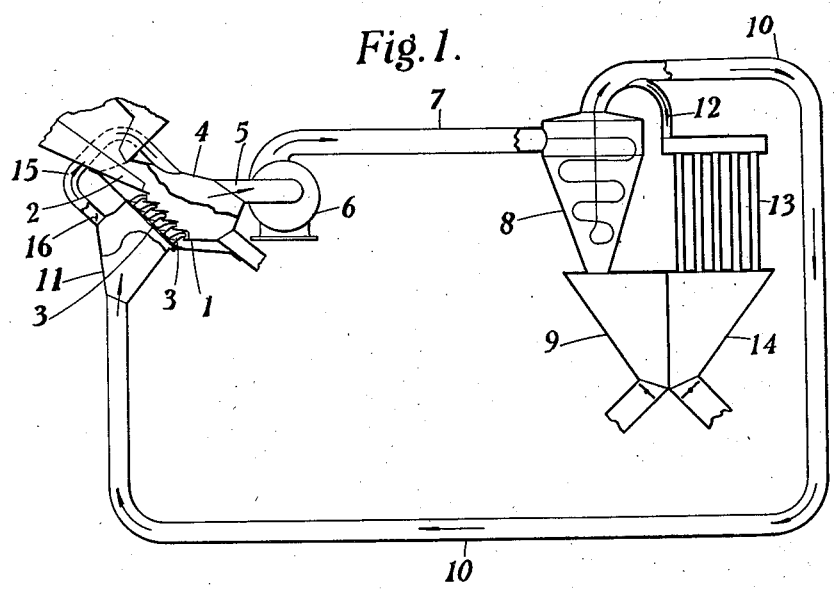
Figure 1 is a diagrammatic representation of the plant.

In the plant shown in Figure 1, the coal from which the dust is to be separated is delivered from a bunker or elevator to the uppermost of the series of inclined shelves 1 placed within a chute 2 so that the material drops down the chute in a series of cascades each presenting a gas-permeable surface. In the underside of the chute 2 there is a series of valve-controlled nozzles 3 having relatively small mouths or openings, one being arranged in close proximity to each cascade. The valve controlling the flow of air through the nozzles 3 may conveniently consist of plain rotatable discs pivoted about a diameter. On the upper side the chute 2 is closed by a hood 4 connected by a pipe 5 to the suction side of a fan 6. This fan delivers into a pipe 7 leading to a cyclone separator 8 where the bulk of the dust picked up by the current of air passing across the chute 2 is separated and deposited in a receptacle 9. The air in the cyclone 8 probably takes some such course as that indicated by the arrows and finally leaves the cyclone at the top. It is then divided into two streams, the main stream passing through a pipe 10 to a chamber 11 enclosing the inlets of the nozzles 3, and a subsidiary stream passing through a pipe 12 to a filter 13. The air which leaves the cyclone separator contains light dust and the filter 13 serves to extract this dust from the part of the air passing through the pipe 12 before the latter escapes into the atmosphere. This light dust is ultimately deposited in a receptacle 14.

A by-pass pipe 15 leads from the chamber 11 to the hood 4 and contains a regulating valve 16.

In operation the fan 6 is driven at a constant rate such that, for example it draws in five volumes of air in a given time. The plant is then adjusted so that all these five volumes pass to the cyclone separator 8.

In operation the fan 6 is driven at a constant rate such that, for example it draws in five volumes of air in a given time. The plant is then adjusted so that all these five volumes pass to the cyclone separator 8 but that afterwards four volumes are returned to the pressure chamber 11 while one passes through the filter 13 to the atmosphere. If the by-pass pipe 15 is completely closed by the valve 16, all four volumes will pass through the nozzles 3 and pick up dust from the falling coal. In order to make up the fifth volume required by the fan, air will be positively induced at both ends of the chute 2 so that any escape of dust-laden air into the atmosphere is avoided. This makes it quite unnecessary to provide any valves or other sealing devices at the end of the chute.

The pressure in the pipe 5 leading to the fan 6 will be below atmospheric pressure, but the pressure on the delivery side of the fan, in the cyclone 8 and in the pressure chamber 11, is above atmospheric pressure and the pressure drops to atmospheric pressure in the chute 2, this arrangement ensuring that the cyclone 8 works under pressure. The cyclone deposits the large sizes of dust in the receptacle 9, while a supply of very fine dust is obtained in the receptacle 14.

Both the pressure and the quantity of air passing through the nozzles 3 can be controlled by opening the valve 16 and thus allowing some of the air from the pressure chamber 11 to by-pass the chute. By this means regulation may be effected in the grade of dust removed without reducing the normal volume of air circulating around the system and without allowing any dust deposit due to fall of air velocity.

In the modified system shown in Figure 2 the cyclone separator 8 is interposed between the fan 6 and the hood 4, while the branch pipe 12 leading to the filter 13 runs from the pipe 10 which connects the delivery side of the fan 6 with the pressure chamber 11. This pipe 12 contains a regulating valve 17. This arrangement of the plant is not as effective as that shown in Figure 1 because the cyclone is working under suction and not, therefore, under the most efficient conditions. However, the amount of dust which passes through the fan is considerably less than with the arrangement shown in Figure 1, and this may be of considerable advantage if the dust is of a very destructive nature.

In the construction shown in Figure 3, the actual chamber through which the material passes does not take the form of a chute but of a series of shelves 18 which form means for supporting the materials while allowing air to pass through them. The whole chamber 19, which contains the shelves 18 and includes the pressure chamber 11 and the hood 4, is mounted on inclined pivoted rods 20 and is arranged to be rocked or reciprocated by means of a crank 21 and connecting rods 22. The material is delivered down a chute 23 to the shelves 18 and is caused by the vibratory or oscillatory movements of the chamber to travel across the shelves and leave the chamber through an opening 24. The pipes 5 and 10 are connected to the chamber 19 by means of flexible connections 25 and 26. The construction and arrangement of the fan, cyclone, filter and air pipes or equivalent apparatus, may be of any suitable kind, such as either of the arrangements shown in Figures 1 and 2. Of course, in a construction such as that shown in Figure 3 the flexible connections may be inserted between the chamber proper and the hood 4 on the one hand and the hood 11 forming the pressure chamber on the other hand.

We claim:

1. In a plant for the separation of dust from coal or like materials, the combination in an air circuit through which air circulates continuously of a constant volume fan for causing a stream of air to travel round said circuit, a dust separator and a dust extraction chamber, the chamber being provided with air supply and withdrawal hoods connected in the circuit and with unsealed openings through which the materials are charged and discharged, the withdrawal hood being connected to the suction side of said fan, a plurality of nozzles within said chamber and adapted to direct air from the air supply hood through said chamber and in a direction generally transverse to the direction of movement of the materials to be separated therein, means for discharging from the circuit at a point in advance of the chamber some of the air passing therethrough while inducing make-up air to the stream through at least the material charging opening of said chamber, and means for by-passing some of the air of the diminished stream from the air supply hood to the air withdrawal hood and about said chamber.

2. In a plant for the separation of dust from coal or like materials, the combination in an air circuit through which air circulates continuously of a constant volume fan for causing a stream of air to travel round said circuit, a dust separator and a dust extraction chamber, the chamber being provided with air supply and withdrawal hoods connected in the circuit and with unsealed openings through which the materials are charged and discharged, the withdrawal hood being connected to the suction side of said fan, a plurality of nozzles within said chamber and adapted to direct air from the air supply hood through said chamber and in a direction generally transverse to the direction of movement of the materials to be separated therein, means for discharging from the circuit at a point in advance of the chamber some of the air passing therethrough while inducing make-up air to the stream through at least the material charging opening of said chamber, means for by-passing some of the air of the diminished stream from the air supply hood to the air withdrawal hood and about said chamber, and a valve in controlling relation to said by-pass means.

3. In a plant for the separation of dust from coal or like materials, the combination in an air circuit through which air circulates continuously of a constant volume fan for causing a stream of air to travel round said circuit, a dust separator and a dust extraction chamber, the chamber being provided with air supply and withdrawal hoods connected in the circuit and with unsealed openings through which the materials are charged and discharged, the withdrawal hood being connected to the suction side of said fan, a plurality of nozzles within said chamber and adapted to direct air from the air supply hood through said chamber and in a direction generally transverse to the direction of movement of the materials to be separated therein, valves in said nozzles, means for discharging from the circuit at a point in advance of the chamber some of the air passing therethrough while inducing make-up air to the stream through at least the material charging opening of said chamber, a by-pass from the air supply to the air withdrawal hood, and a valve in said by-pass for controlling the amount of air passing therethrough.

BERTRAM NORTON.
JOHN NEWTON COLLINS.